United States Patent
Twigg et al.

(10) Patent No.: US 6,557,340 B1
(45) Date of Patent: May 6, 2003

(54) SYSTEM AND METHOD FOR PURIFYING EXHAUST GASES

(75) Inventors: Martin Vincent Twigg, Caxton (GB); Ian Carmichael Wishart, Aston Tirrold (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 09/806,118

(22) PCT Filed: Oct. 6, 1999

(86) PCT No.: PCT/GB99/03102

§ 371 (c)(1),
(2), (4) Date: Mar. 29, 2001

(87) PCT Pub. No.: WO00/21646

PCT Pub. Date: Apr. 20, 2000

(30) Foreign Application Priority Data

Oct. 9, 1998 (GB) .............................................. 9821947

(51) Int. Cl.⁷ ................................................. F01N 3/00
(52) U.S. Cl. ............................... 60/275; 60/274; 60/311
(58) Field of Search .......................... 60/275, 274, 311; 204/164; 55/DIG. 30

(56) References Cited

U.S. PATENT DOCUMENTS

| | | | |
|---|---|---|---|
| 4,902,487 A | | 2/1990 | Cooper et al. |
| 5,423,180 A | * | 6/1995 | Nobue et al. ................. 60/275 |
| 5,423,904 A | * | 6/1995 | Dasgupta ............... 55/DIG. 30 |
| 5,705,131 A | | 1/1998 | Rutland |
| 5,711,147 A | * | 1/1998 | Vogtlin et al. ................. 60/275 |
| 5,807,466 A | * | 9/1998 | Wang et al. ................. 204/177 |
| 5,822,981 A | * | 10/1998 | Williamson et al. ........... 60/275 |
| 6,038,853 A | * | 3/2000 | Penetrante et al. ............ 60/275 |
| 6,038,854 A | * | 3/2000 | Penetrante et al. ............ 60/275 |
| 6,047,543 A | * | 4/2000 | Caren et al. ................... 60/275 |
| 6,185,930 B1 | | 2/2001 | Lepperhoff et al. |

FOREIGN PATENT DOCUMENTS

| | | |
|---|---|---|
| DE | 196 45 689 | 5/1998 |
| DE | 198 26 831 | 10/1999 |
| EP | 0 341 832 | 11/1989 |
| GB | 2 270 013 | 3/1994 |
| GB | 2 274 412 | 7/1994 |
| WO | 98/09699 | 3/1998 |

OTHER PUBLICATIONS

Mizuno, Akira et al., "Reactive Absorption of NOx Using Wet Discharge Plasma Reactor," *IEEE Transactions on Industry Applications*, vol. 31, No. 6, Nov./Dec. 1995, pp. 1463–1468.
International Search Report dated Feb. 9, 2000.
British Search Report dated Dec. 15, 1998.

* cited by examiner

*Primary Examiner*—Thomas Denion
*Assistant Examiner*—Diem Tran
(74) *Attorney, Agent, or Firm*—RatnerPrestia

(57) ABSTRACT

A system for purifying exhaust gases from a diesel or like engine (1) comprises a filter (3) and a plasma generator (5). The plasma generator converts NO and/or $N_2$ to $NO_2$ and/or generates ozone, which is found to be particularly effective at causing low temperature combustion of soot trapped on the filter.

21 Claims, 1 Drawing Sheet

SYSTEM AND METHOD FOR PURIFYING EXHAUST GASES

Figure 1:
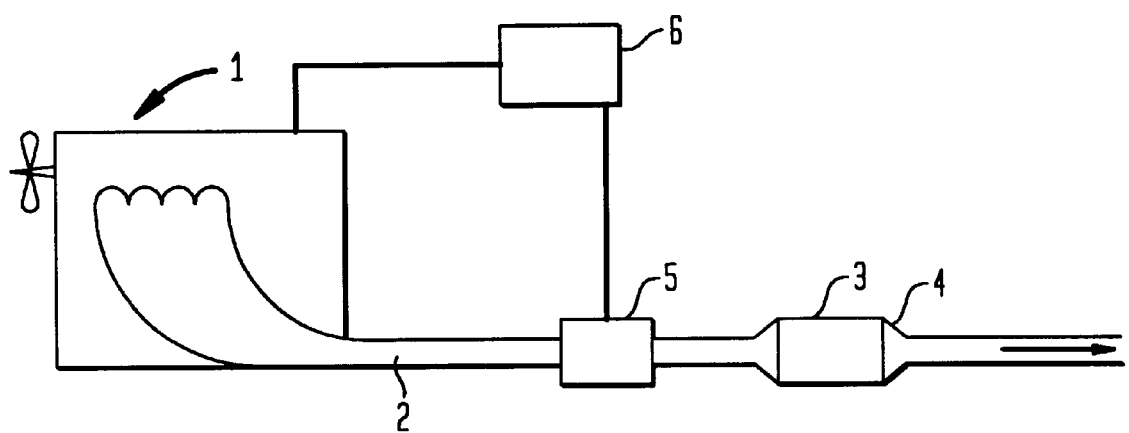

This application is the U.S. national phase application of PCT International Application No. PCT/GB99/03102.

This invention concerns the purification of exhaust gases, especially the purification of such gases from diesel and other "lean-burn" engines.

Diesel engines are in widespread use in all types of vehicles, stationary power sources and naval and commercial shipping. They are very fuel-efficient, but because of their combustion characteristics generate particulate matter (soot, often called "PM") on which a variety of organic substances may be absorbed, including unburnt hydrocarbons (HC) and sulphuric acid produced by oxidation of sulphur dioxide derived from sulphur species present in the fuel or in lubricants. Other engines, such as gasoline direct injection ("GDI"), can also produce significant quantities of PM, and we consider that the need for removing such PM will soon be expressed in legislation. Nonetheless, the invention may be applied to combustion processes generally, as well as potentially to chemical process stacks/exhausts, and to combustion engines operating at $\lambda=1$ or greater, or lean-burn engines operating at stoichiometric or rich in order to regenerate some exhaust gas aftertreatment device. For simplicity, however, we concentrate on diesel engines hereinafter.

In order to meet various regulations concerning the level of pollutants, it has become commonplace to fit vehicles with an oxidation or three-way catalyst, which only achieves partial removal of PM. The removal of particulates is generally achieved by using some form of filter or trap, which may be cleaned or regenerated intermittently. It has been suggested to include a catalyst in the fuel to the engine, and as well as platinum group metals ("PGMs"), iron, copper or cerium compounds have been suggested. A particulate trap may be catalysed to lower the soot combustion temperature, and some form of external heating, for example electric heating of the trap or of air fed thereto, may be used to initiate soot combustion.

A particularly successful soot trap is marketed by Johnson Matthey PLC as the "CRT" ("Continuously Regenerating Technology") and is described in U.S. Pat. No. 4,902,487. This system uses a conversion of NO in the exhaust gas to $NO_2$, which was discovered to be much more effective at typical low diesel exhaust gas temperatures in the combustion of soot than air or any other exhaust gas component. Thus, $NO_2$ is typically effective to combust PM at about 250° C., whereas oxygen is effective at about 650° C.

It has been suggested to use a plasma generator for exhaust gas purification (see for example GB 2,274,412 and 2 270 013, UK Atomic Energy Authority). Although it was probably not previously recognised in connection with exhaust gas treatment, such a system produces considerable quantities of $NO_2$. Systems such as previously described do not include any filter or trap in combination with a plasma generator, but we believe that this may be a particularly effective system for treating diesel and similar lean-burn exhaust gases.

Accordingly, the present invention provides a system for the treatment of such exhaust gases, comprising a plasma generator effective to convert at least a portion of NO and/or nitrogen in the exhaust gases to $NO_2$ and/or to generate ozone and a filter effective to trap a desired proportion of soot from the exhaust gases, whereby said trapped soot is combusted by reaction with $NO_2$ and/or ozone, at a markedly lower temperature than required by $O_2$.

We believe, although we do not wish to be bound by any theory, that in the present invention $NO_2$ may be generated not only by oxidation of NO in the exhaust gases, but also by oxidation of nitrogen to yield NO, which is itself converted to $NO_2$. In the latter case, there is no reliance upon the quantities of NOx leaving the engine. It is also believed that the present invention is especially valuable in that it is not adversely affected by the presence of sulphur in the fuel or in lubricants, which can poison conventional catalysts.

The invention further provides a method of reducing emissions from exhaust gases from diesel and like engines, comprising trapping soot on a filter and continuously or intermittently combusting the soot by reaction with $NO_2$ and/or ozone produced by a plasma generator, preferably using a plasma treatment of at least a portion of the exhaust gases.

The plasma generator may be any suitable type producing a non-thermal plasma, and may be enhanced by electromagnetic radiation. Suitable plasma generators include high voltage (e.g. 20 kV or more) alternating current, preferably pulsed, generators, suitably using two dielectric plates positioned in the gas flow, and piezoelectric devices such as piezoceramic transformers. It may be positioned to treat all or a portion of the exhaust gases upstream of the filter, or may be fitted downstream of the filter to treat all or a portion of the filtered exhaust gas, with recirculation of plasma-treated gases to the filter. In one embodiment of the present invention, a pre-determined proportion of the exhaust gases is treated by the plasma to cause substantially all of the NO present to be converted into $NO_2$, and the resulting gases blended with untreated exhaust gases, thus resulting in a blend of NO and $NO_2$, which according to some studies, may be more effective for the purposes of the present invention than a gas containing substantially only $NO_2$ in admixture with other exhaust gas components.

The filter used may be a woven or knitted wire filter, a gas-permeable metal or ceramic foamed mass or a wall flow filter of generally known type (honeycomb monolith). For certain vehicles, especially light cars or vans, it may be necessary or desirable, to use a filter design which collects only 80% or so by weight of the total soot particulates and preferably incorporates a by-pass and/or pressure relief valve. The filter may be partially or completely catalysed if desired. A catalysed trap may improve the aggregate removal of pollutants.

A modification of the present invention incorporates a means for removing NOx downstream of the filter and plasma generator. Such means may be a NOx trap, which technology is available to the skilled person, and generally includes one or more alkali earth metal compounds, especially calcium oxide or barium oxide, or alkali metal, carried on a metal or ceramic honeycomb-type support. The NOx trap is desirably used in combination with a lean-NOx catalyst. Another means for removing NOx is Selective Catalytic Reduction ("SCR"), which is well established for stationary power sources and is receiving increasing attention for vehicular applications. Such a modified system can be effective to meet all current and known future emission control regulations for diesel and like engines.

The plasma generator may be controlled and actuated by an engine management unit, or other microprocessor control unit, to operate intermittently according to certain engine operating conditions (speed, load etc) which have been pre-determined to generate more soot. The identification of such operating conditions can be readily accomplished by one skilled in the art, and such conditions include times when the emission of particulate matter would be undesirably high in the absence of any treatment therefor. Alternatively, the plasma generator may operate during all operational conditions of the engine, which system has the benefit of simplicity, but this may be undesirable if the engine is in an operating condition in which significant quantities of NOx are generated, or during regeneration of a NOx trap.

The present invention, at least in its most preferred embodiments, in addition to being particularly effective at controlling emissions, permits the engine designers to design and tune the engine for power and/or fuel efficiency, rather than being forced to make compromises in engine design to minimise the generation of NOx and particulates. This can be a significant advantage for commercial vehicles, but allows flexibility in design for all engines and types of vehicles.

A further variant of the present invention is to feed a reductant, which term includes hydrocarbon fuel, e.g. diesel fuel, ammonia, ammonia precursors, hydrogen etc. into the exhaust gases either upstream or downstream of the plasma generator.

The present invention is illustrated with reference to the accompanying drawing, which is a schematic diagram of a system according to the invention.

A diesel engine is shown at 1, and has an exhaust system, 2. Conventional silencer boxes and ancilliary equipment are not shown. A wall flow filter, 3, retained within a metal box, 4, is mounted in the exhaust system. Mounted close upstream to the filter, is a plasma generator, 5, which is operated according to signals from the engine management unit, 6.

Testing of the described system is continuing, but early indications are that substantially all soot particles trapped on the filter are removed continuously, although there are variations in soot build up and removal rates. $NO_2$ and ozone have been detected in the exhaust gases after the plasma generator, with substantially lower levels after the filter.

The following Examples illustrate features of the present invention.

EXAMPLE 1

The non-thermal plasma discharge generator used comprised a ceramic tube 10 cm long and 5 cm external diameter in which a bed of pelleted material of suitable dielectric constant was held between two circular stainless steel mesh electrodes. The mesh aperture size was about 0.5 mm. Typically the pellets were of size about 3 mm, and occupied a length of 1–3 cm in the ceramic tube. The packed volume was about 12–36 $cm^3$. One electrode was grounded via a large spring that maintained a physical pressure on the bed of pellets. The other electrode was fixed and connected to the 'live' side of a power supply capable of providing an adjustable AC voltage of 50 Hz up to 10 kV and powers of up to 1 kW.

A gas mixture designed to approximate key features of exhaust gas from a diesel engine containing nitric oxide (300 ppm), propene (300 ppm), oxygen (12%), and water vapour (about 1%) with the balance being helium was passed through the plasma generator at a flow rate of 250 ml $min^{-1}$. A mass spectrometer was used to determine and quantify the composition of gas exiting the generator. When operating at ambient temperature with a voltage of about 3 kV applied across the electrodes destruction of propene was almost 100%, and a large quantity of carbon dioxide was formed. However, the amount of carbon dioxide was only about 35% of that expected for complete combustion. Traces of formaldehyde were detected but carbon monoxide probably accounted for most of the other oxidation products. However, its quantification was complicated by traces of nitrogen having a similar mass number.

Nitric oxide was also completely removed when the potential was applied to the electrodes, and substantial levels of nitrogen dioxide (mass 46) were detected in the exit gas. The amount of nitrogen dioxide detected typically corresponded to about 55% of the amount of the original nitric oxide and depended on the nature of the pellets. With alumina pellets higher surface area material (eg 200 $m^2 g^{-1}$) gave higher conversions than low surface area material (eg 5 $m^2 g^{-1}$). Alumina pellets coated with a thin layer of barium titanate or lead titanate gave higher conversions than just pure alumina pellets. Increasing the voltage applied across the electrodes also increased conversion of nitric oxide to nitrogen dioxide. These experiments demonstrate nitric oxide is oxidised to nitrogen dioxide by passage through a non-thermal plasma even when hydrocarbon is present.

EXAMPLE 2

A cordierite wallflow filter (5.66 inch diameter, 6.0 inch long) having 100 cells $inch^{-2}$ and $17/1000$ inch thick walls was located in the exhaust pipe of a four cylinder 1.9 litre direct injection turbo charged Diesel engine that ran on fuel containing 350 ppm sulphur. The engine was operated at 1200 rpm with half load for 10 hours. The filter was then removed from the exhaust pipe and ground to a powder that was pressed into small granules (250–350 $\mu$m). A sample of these sooty black granules (0.05 g) was placed in a stainless steel tube (6 mm diameter) and held in place by two small loose plugs of quartz wool. The tube was connected to the exit of the plasma generator of Example 1, and the gas was heated to temperatures in the range of 150–300° C. by electrical heating tape before passing over the sample containing Diesel soot. Analysis of the gas once it had passed over the soot containing sample was achieved by a mass spectrometer. Increasing the temperature of the gas passing over the sample resulted in increasing amounts of carbon dioxide being formed, and increasing amounts of nitric oxide in the gas after the sample. After maintaining the sample temperature at about 240° C. for an hour the discharged granules had only a light grey colouration indicating that most of the soot had been removed by exposure to the plasma treated gas. This experiment shows that gas containing nitric oxide that has been oxidised in a non-thermal plasma generator oxidises Diesel soot at temperatures above about 150° C., and so such a device could be used to keep a Diesel particulate filter free of excess soot by continuously combusting soot, even at relatively low temperatures.

It will be appreciated that many variations may be made to the system as particularly described, without departing from the present inventive concept. In particular, the skilled person will appreciate that Example 2 above illustrates a practical method for removing soot from a filter even at the low temperatures met with many modern engine designs, particularly when operating at idle or under low load. This is a valuable contribution to the art.

What is claimed is:

1. A system for treating exhaust gases including NO, nitrogen and particulate matter, which system comprising a plasma generator for generating at least one of: (1) $NO_2$ from the NO or nitrogen or both; and (2) ozone, and a filter for trapping a desired proportion of the particulate matter and a microprocessor for controlling the plasma generator to operate during engine conditions which generate increased amounts of particulate matter, wherein trapped particulate matter is combusted by reaction with at least one of $NO_2$ or ozone, and wherein the plasma generator is located downstream of the filter and all or a portion of the plasma-treated and filtered exhaust gases are recirculated to the upstream side of the filter.

2. A system according to claim 1, further comprising means for removing or reducing NOx mounted downstream of the filter and the plasma generator.

3. A system according to claim 2, wherein the means for removing or reducing NOx comprises a NOx trap.

4. A system according to claim 2, wherein the means for removing or reducing NOx comprises SCR.

5. A system according to claim 1, wherein the plasma generator comprises a piezoelectric device.

6. A system according to claim 1, wherein the microprocessor is comprised in an engine management unit.

7. A system according to claim 1, wherein a proportion of the exhaust gases are plasma treated and blended with untreated exhaust gases to create a desired blend of NO and $NO_2$.

8. A system according to claim 7, wherein all the plasma-treated and filtered exhaust gases are recirculated to the upstream side of the filter.

9. A system according to claim 1, wherein the portion of the plasma-treated and filtered exhaust gases are recirculated to the upstream side of the filter.

10. A method of reducing exhaust gas emissions from diesel engines, comprising the steps of: creating a desired blend of NO and $NO_2$ by plasma treating a proportion of the exhaust gases to generate $NO_2$ during engine conditions which generate increased amounts of particulate matter and blending the plasma-treated exhaust gases with untreated exhaust gases, wherein the proportion of exhaust gases is selected to achieve the desired blend and plasma treating the proportion of exhaust gases further generates ozone; trapping particulate matter on a filter; and intermittently combusting the trapped particulate matter by reaction with $NO_2$ in the desired blend and with ozone.

11. A method according to claim 10, wherein all, or a portion of, the exhaust gases are passed through the plasma generator and contacted with trapped particulate matter.

12. A system for treating exhaust gases from diesel engines including NO, nitrogen and particulate matter, which system comprising a plasma generator for generating at least one of: (1) $NO_2$ from the NO or nitrogen or both; and (2) ozone, and a filter for trapping a desired proportion of the particulate matter and a microprocessor for controlling the plasma generator to operate during engine conditions which generate increased amounts of particulate matter, wherein trapped particulate matter is combusted by reaction with at least one of $NO_2$ or ozone, and wherein the plasma generator is located downstream of the filter and all or a portion of the plasma-treated and filtered exhaust gases are recirculated to the upstream side of the filter.

13. A system according to claim 12, further comprising means for removing or reducing NOx mounted downstream of the filter and the plasma generator.

14. A system according to claim 13, wherein the means for removing or reducing NOx comprises a NOx trap.

15. A system according to claim 13, wherein the means for removing or reducing NOx comprises SCR.

16. A system according to claim 12, wherein the plasma generator comprises a piezoelectric device.

17. A system according to claim 12, wherein the microprocessor is comprised in an engine management unit.

18. A system according to claim 12, wherein a proportion of the exhaust gases are plasma treated and blended with untreated exhaust gases to create a desired blend of NO and $NO_2$.

19. A method according to claim 18, wherein all the plasma-treated and filtered exhaust gases are recirculated to the upstream side of the filter.

20. A method according to claim 12, wherein the portion of the plasma-treated and filtered exhaust gases are recirculated to the upstream side of the filter.

21. A method of reducing exhaust gas emissions from diesel engines comprising trapping particulate matter on a filter and intermittently combusting the trapped particulate matter by reaction with at least one of $NO_2$ or ozone generated by a plasma generator during engine conditions which generate increased amounts of particulate matter, and wherein the plasma generator is located downstream of the filter and the method further comprises recirculating all or a portion of the plasma-treated and filtered exhaust gases to the upstream side of the filter.

* * * * *

UNITED STATES PATENT AND TRADEMARK OFFICE
CERTIFICATE OF CORRECTION

PATENT NO. : 6,557,340 B1
DATED : May 6, 2003
INVENTOR(S) : Twigg et al.

It is certified that error appears in the above-identified patent and that said Letters Patent is hereby corrected as shown below:

<u>Title page,</u>
Item [56], References Cited, FOREIGN PATENT DOCUMENTS, insert
-- EP    0 758 713    02/1997 --

Signed and Sealed this

First Day of June, 2004

JON W. DUDAS
*Acting Director of the United States Patent and Trademark Office*